(12) United States Patent
Rolih

(10) Patent No.: US 9,934,699 B2
(45) Date of Patent: Apr. 3, 2018

(54) SEE, DO, REVIEW, FULL-CYCLE INSTRUCTION PERFORMANCE ANALYSIS PROCESS AND SYSTEM

(71) Applicant: Michael J. Rolih, Rochester, MN (US)

(72) Inventor: Michael J. Rolih, Rochester, MN (US)

(73) Assignee: Repetix, LLC, Rochester, MN (US)

( * ) Notice: Subject to any disclaimer, the term of this patent is extended or adjusted under 35 U.S.C. 154(b) by 823 days.

(21) Appl. No.: 14/460,102

(22) Filed: Aug. 14, 2014

(65) Prior Publication Data

US 2016/0049090 A1 Feb. 18, 2016

(51) Int. Cl.
*G09B 19/00* (2006.01)

(52) U.S. Cl.
CPC .................. *G09B 19/0038* (2013.01)

(58) Field of Classification Search
None
See application file for complete search history.

(56) References Cited

U.S. PATENT DOCUMENTS

| 2005/0151852 A1* | 7/2005 | Jomppanen | H04N 5/0733 348/218.1 |
| 2007/0143382 A1* | 6/2007 | Luster | A63B 24/0021 708/100 |
| 2012/0258433 A1* | 10/2012 | Hope | G06F 19/3481 434/247 |

* cited by examiner

*Primary Examiner* — Bruk Gebremichael
(74) *Attorney, Agent, or Firm* — Vitale, Vickrey, Niro & Gasey

(57) ABSTRACT

A computer implemented education and playbook system and method for providing an interactive, recursive and in situ coaching system. A coach can use a portable electronic device to transmit play information to a number of players via wearable electronic devices, the play then being filmed and time stamped for subsequent review and storage in a coach's practice plan.

14 Claims, 2 Drawing Sheets

200

SEE, DO, REVIEW, FULL-CYCLE INSTRUCTION PERFORMANCE ANALYSIS PROCESS AND SYSTEM

FIELD OF THE INVENTION

The present invention relates generally to a computer implemented education and playbook system and method for providing an interactive, recursive and in situ coaching system, and more specifically to providing and implementing a system whereby a coach can use a portable electronic device to transmit play information to a number of players via wearable electronic devices, the play then being filmed and time stamped for subsequent review and storage in a coach's practice plan and playbook.

BACKGROUND OF THE INVENTION

Team sports invariably involve a series of practices incorporating a recursive, repetitive learning process in order to maximize performance. As part of this process, coaches can keep copies of plays in notebooks, on laptop computers, handheld computing devices and elsewhere. During a practice, a coach may have no direct access to recorded plays and no way to record new plays or integrate or review the performance of existing plays.

In some sports like football, a one-way radio is commonly used between a coach and a player, where the player is equipped with a radio receiver and earphone or speaker in a helmet. The coach can verbally relay plays or ideas to the player. U.S. Pat. No. 8,608,478 (Luster) further teaches a coach's electronic clipboard with an optional associated remote personal unit worn by a player, such as a wrist or other unit with a small display worn by a player. Optionally, Luster teaches that real-time game photographs can be displayed on the coach's electronic clipboard.

The state of the prior art, however, fails to provide an automated way to improve efficiency of practice time, especially at the college and high school levels. There exists a pronounced need to avoid lost time during practice due to negative repetitions (i.e., repetitions that occur with significant mistakes, thus necessitating further repetition of the same play). Such negative repetitions occur due to (among other reasons) ineffective communications between players and coaches or lack of knowledge. Such problems are more pronounced for teams operating under institutional practice time restrictions. For instance, the NCAA imposes a 20-hour work rule, where mandatory player/coach interaction is restricted to a maximum of 20-hours per week. Any effective loss of time during practice, such as occurs with negative repetitions, can result in significant competitive disadvantages during game day.

Thus, there is a need for a system and method where a player can see a play effectively displayed prior to physical execution in order to provide each player with a brief reminder of specific play responsibility. Further, there is a need to automatically capture and store the physical execution of the play to enable the prompt review by the players with immediate feedback and additional communication by the coaches as desired.

Definition of Terms

The following terms are used in the claims of the patent as filed and are intended to have their broadest plain and ordinary meaning consistent with the requirements of the law:

A "coaching computer module" is a software package accessed via a tablet, PDA, or other handheld mobile device which enables a coach to provide input.

A "playbook" is a compendium of plays to be studied and practiced, which are stored in a Memory, such as in a server or accessible by a server, for access by a coaching computer module and practice module.

A "practice module" is a software module which can be accessed via a coaching computer module or a server or the like which receives and stores plays from the playbook and related input selected by a coach to be practiced, and optionally receives and stores time stamped and cut plays which have been called by the coaching computer module and filmed. "Wearable computer devices" are portable hardware assemblies containing electronic display capabilities, which may be worn around the forearm or similarly attached to a user during a practice.

A "playbook generation module" is a software interface for a coach to generate plays.

A "software application trigger" is a software tool for selecting a camera in response to a signal via a coaching computer module for recording a play being practiced.

An "authentication module" is a software security package for preventing unauthorized users from accessing the claimed system.

Where alternative meanings are possible, the broadest meaning is intended. All words used in the claims set forth below are intended for use in the normal, customary usage of grammar and the English language.

SUMMARY OF THE INVENTION

The present invention relates to one or more of the following features, elements or combinations thereof.

The present invention encompasses a system and method for interactively and recursively coaching a practice in situ. It produces a superior coaching efficiency compared to current practice plans, because it is believed to reduce inefficient use of practice time by 20-30% or more.

One disclosed embodiment is directed to a system providing an interactive, recursive and in situ coaching system including a coaching computer module, which allows a coach to select and generate signals to a plurality of players corresponding to plays from a playbook, a plurality of wearable computer devices for the plurality of players to receive signals from the electronic coaching module, the wearable computer devices including an electronic display for displaying plays and accessing information linked to plays. The system of this embodiment further includes a playbook generation module wherein a user can create or develop plays to be sent via the coaching computer module to the wearable computer devices. The system also includes a practice module, electronically linked to the playbook, for obtaining information that is entered by a user from the playbook that can be used during a practice period.

In addition, the system includes a server for receiving and sending signals between the coaching computer module and the plurality of wearable computer devices, and a software application trigger accessible through the server that selects at least one camera for recording the performance of plays selected by the coaching computer module wherein the selection of a given play by the coaching computer module causes the conclusion filming of the prior play, with the resulting time stamped play recording being accessible for review by the wearable computer devices and/or the coaching computer module, and such time stamped play recording being capable of recorded in the practice module for further review.

Another embodiment of the present invention may also include an authentication module to prevent the unauthorized access of the practice plan or playbook.

Thus, it can be seen that one object of the disclosed invention is to provide system for an interactive, recursive in situ coaching system.

A further object of the present invention is to reduce or eliminate negative repetitions during sporting practices.

Another object of the invention is to provide for the automatic recording and immediate review of plays selected by a coach to be practiced.

Still another object of the present invention is to provide for a method whereby a player can review a play to be practices immediately prior to be executed, and may further review the results of such a practiced play immediately after execution.

It should be noted that not every embodiment of the claimed invention will accomplish each of the objects of the invention set forth above. For instance, certain claimed embodiments of the invention will not require authentication module. In addition, further objects of the invention will become apparent based upon the summary of the invention, the detailed description of preferred embodiments, and as illustrated in the accompanying drawings. Such objects, features, and advantages of the present invention will become more apparent in light of the following detailed description of an example embodiment thereof, and as illustrated in the accompanying drawings.

DETAILED DESCRIPTION OF EMBODIMENTS OF THE INVENTION

Figure 1:
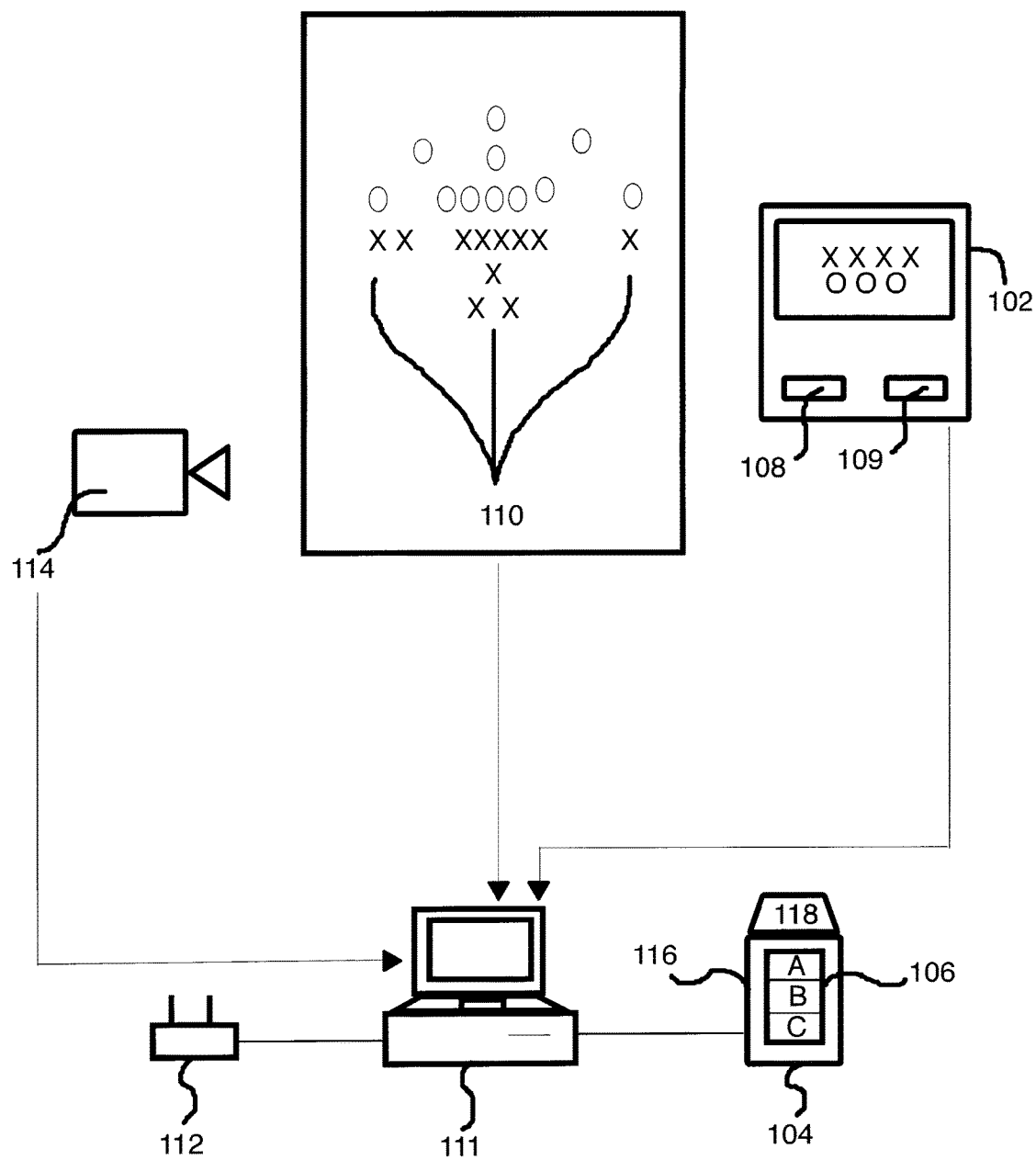
FIG. 1 is a schematic of a first preferred embodiment of the interactive, recursive and in situ coaching system of the present invention.

As can be seen in FIG. 1, the system 100 includes a coach's portable electronic device 102, such as a cell phone, tablet, or laptop. The coach's portable electronic device 102 accesses a memory 104 which may be stored locally and/or accessed via a remote server 111, the memory 104 having an electronic playbook application 106 stored thereon. The electronic playbook application 106 preferably includes multiple animated plays which may optionally be linked or segregated with associated notes from the coach and/or segments of the play being executed as described herein below. The electronic playbook application 106 further includes the ability to add further plays and/or modify existing plays according to the coach user's preferences.

The electronic playbook application 106 is a software application most preferably includes a coaching computer module 106a which is accessed by the coach's portable electronic device 102 so as to enable the coach to provide various inputs, including the transfer button and the review prompt as described below. The electronic playbook application further preferably includes a practice module 106b which may be integrated with or accessed by the coaching computer module so as to receive and store plays and related input selected by a coach to be practiced, and further may receive and store time stamped and cut plays which have been called by the coaching computer module 106a and stored. In addition, the electronic playbook application 106 further includes a playbook generation module 106c which provides a software interface for a coach to generate plays, either on the coach's portable electronic device 102 or separately, away from practice on any computer device (not shown) which can access the coaching computer module 106a.

The coach's portable electronic device 102 will enable a coach to transmit a selected, single animated playbook play from available plays within the electronic playbook application 106 by touching a transfer button 108 (or using a similar activation command or other button) which will cause the electronic playbook application 106 to transfer the selected animated playbook play to all individual players and coaches who are wearing a portable electronic display receiver 110 (e.g., a wearable 3.5" display screen) that is registered or otherwise linked to the electronic playbook application 106, preferably through server 111 and/or router 112.

By pressing the transfer button 108, the electronic playbook application 106 further causes a series of local video actions with one or more video cameras 114 that are videotaping the practice for feedback to the coaches and players. Specifically, by pressing the transfer button 108, the electronic playbook application 106 issues a command to each video camera 114 to time-stamp, cut and transfer the prior videotaped segment (corresponding to the prior play) into the memory 104 to a coaches practice module 106b associated with the electronic playbook application 106, with that play being stored in memory 104 and linked with its associated play within the electronic playbook application 106. Preferably, the system 100 provides a separate segment corresponding to each camera or other video corresponding to a given play, with each segments resulting in a separate "thumbnail" view that the coach's portable electronic device 102 can access.

As the same time that the signal provided by the transfer button 108 is causing the time-stamp, cut and transfer of the prior videotaped segment, that action similarly causes the video camera(s) 114 to begin recording the execution of the next play. Most preferably, this occurs through the use of a software application trigger 116 which activates the desired video recorder(s) in response to the coach's input from the transfer button. That is, in its most preferred form, the system only requires a single press of the transfer button 108 executed by the coach's portable electronic device 102 to time stamp and batch the video of the prior play, and to begin video of the current play.

As the electronic playbook application 106 transfers the selected animated playbook play to all individual players and coaches who are wearing a portable electronic display receiver 110, each player and coach can watch the transferred animated play execute on the respective display screens of their respective portable electronic display receivers 110 and further can identify specific coaching information about the individual play, such as the play name, personnel groupings, coaching sideline signals relevant to their position, and their respective responsibilities within the play.

Upon execution of the selected play, the system further provides for a coach's portable electronic device 102 to include a review prompt 109 (such as a button or other prompt) which enables the coach to transfer video from a clip of the previous play to all portable electronic display receivers 110 for review and to provide immediate feedback about the performance of the executed play, including areas of improvement and additional coaching tips.

In order to prevent the unauthorized access to this system 100, the system further includes an authentication module 118 which is a software security package for presented unauthorized users from accessing the contents of the system. This authentication module 118 is most preferably a separate module from the modules of the electronic playbook application 106, though like the electronic playbook application 106 modules, the authentication module 118 preferably resides on the memory 104 at the server 111 so as to make such that any communications with a coach's portable electronic device 102 or a portable electronic display receiver 110 is, in fact, authorized.

Figure 2:
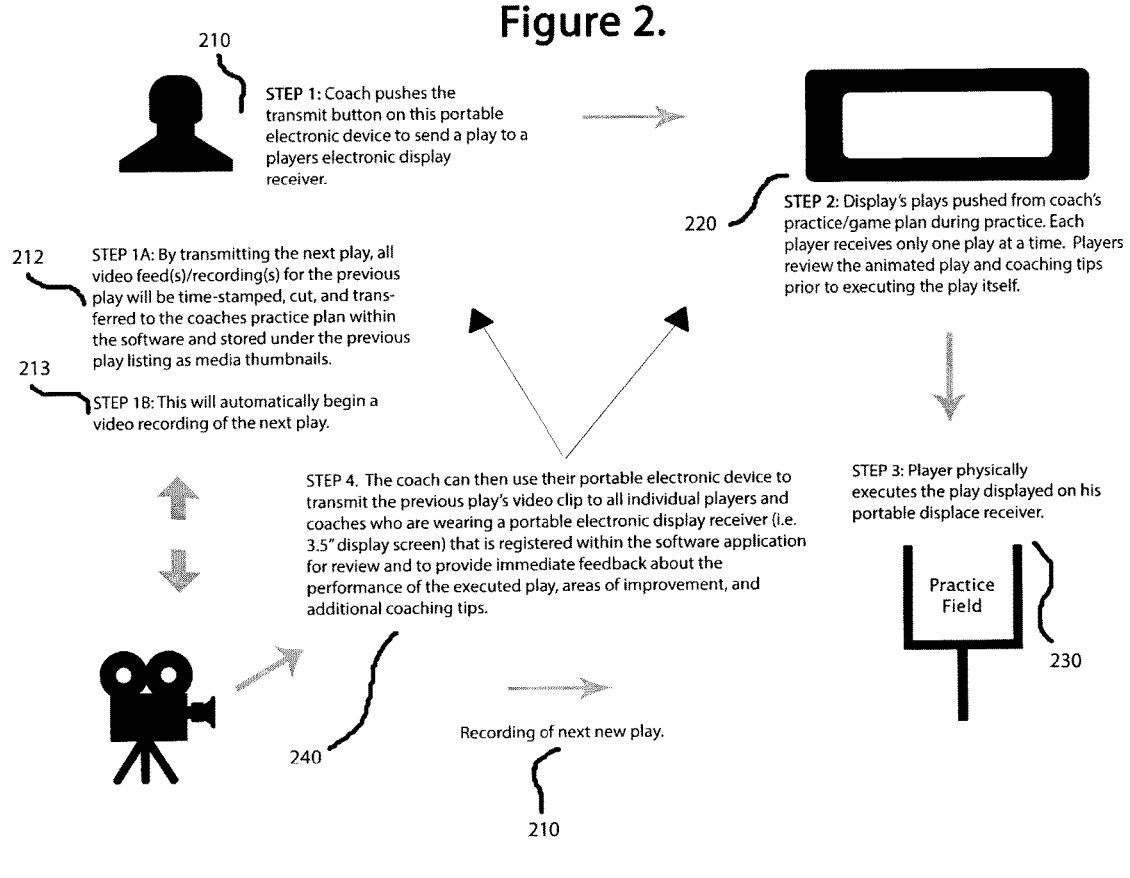
FIG. 2 is a process flow diagram of a preferred embodiment of the interactive, recursive and in situ coaching system of the present invention

As shown in FIG. 2, the process 200 corresponding to the use of the present invention may be diagrammed schematically as a recursive loop. In the first step 210, the coach pushes a transmit button or similar activation device to send a next play to one or more player wearable electronic display receiver. By transmitting the next play, that step simultaneously causes 212 the automatically time stamping, cutting and transfer of the video feed(s) from the prior play in the coaches practice plan within the electronic playbook application. A third simultaneous step 213 is that the transmission of the next play automatically causes the video recorder(s) to begin recording the next play. Then, for the next step 220, the animation for the next play is then displayed to each player and coach on their respective wearable displays, as well as any coaching tips entered by the coach linked to or provided with the next play. Having reviewed the play, the players and coaches then perform the step 230 of physically performing the next play, as well as providing any related coaching signals associated with the play. Finally, the coach's portable electronic device performs the step 240 of transmitting the recording of the just performed play's video clip to each player's portable/wearable electronic device to provide immediate feedback about the performance of the executed play, along with optional notes about areas of improvement and additional coaching tips.

Thus, this system and process provides each player and coach to take (in effect) three repetitions for each individual play within a condensed time span: 1) a mental repetition; 2) a physical repetition; and 3) a review of feedback repetition. This process further occurs immediately on the playing field, and is believe to be a process that can be completed within two minutes per play for football, hockey, lacrosse or soccer, which is crucial for high school and college applications where practice times are limited by regulation. Further, by providing this process in an animated playbook and an associated electronic display, this system and process avoids limitations in current systems which rely upon drawings and memorization, with their attendant problems. For instance, such a system and process reduces common mistakes such as misalignment, missed responsibilities, lack of playbook knowledge, or an inability to focus upon and memorize such playbook drawings. Rather, this system and process allows coaches to focus on positions specific units, giving players the ability to conduct the replay and correct errors instantly through this feedback loop. For instance, those of skill in the art having this teaching will understand that the present invention can include multiple video recorders 114, each focused on a different group of players (e.g., a football practice wherein the first camera is focused on line play, with a second camera focused upon the secondary) thus allowing more precise, immediate, and recursive coaching.

While the disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the spirit and scope of the disclosure as defined by the appended claims.

What is claimed is:

1. A system for providing an interactive, recursive and in situ coaching system comprising:
   a) a coaching computer module, wherein the coaching computer module allows for at least one user to provide at least a first signal corresponding to a first play to be performed and repeated from a playbook and a second signal corresponding to a second play from the playbook to a plurality of players and coaches;
   b) a plurality of wearable computer devices, wherein each of the plurality of wearable computer devices generates an electronic display corresponding to the first play on the wearable computer device, and each of the plurality of wearable computer device access further information linked to the first play;
   c) a playbook generation module electronically linked to the playbook, wherein the at least one user develops at least one play through the playbook generation module that is transmitted via the coaching computer module to a plurality of players and coaches via the plurality of wearable computer devices;
   d) a practice module electronically linked to the playbook, wherein the practice module obtains information that is entered by a user from the playbook that can be used during a practice period;
   e) a server for receiving and sending signals between the coaching computer module and the plurality of wearable computer devices, wherein the coaching computer module sends said first signal to said server, and said server receives said first signal and then transmits said first signal to said plurality of wearable computer devices to be accessed;
   f) a software application trigger accessible through the server that captures a first time stamp signal recording corresponding to said first signal from the coaching computer module, whereby the software application trigger selects at least one camera for recording the performance of the first play, wherein the server transmits the recording of said first play to at least the coaching computer module upon receiving a second time stamp signal corresponding to said second signal from the coaching module and wherein said coaching computer module transmits to said server a signal corresponding to first time stamp signal recording to be transmitted to said plurality of wearable player devices for access for display prior to repeating the performance of the first play so as to enable a quicker analysis and repeat performance of the first play; and
   g) an authentication module accessible by at least one of the playbook, the practice module and the server, wherein the server processes the first signal from the coaching computer only if authentication has been granted by the server, and wherein the said server will receive and then transmit the first signal to the plurality of wearable computer devices having a compatible authentication module.

2. The interactive, recursive and in situ coaching system of claim 1, wherein said coaching computer module stores said first time stamp signal recording, said coaching computer module further linking said first time stamp signal recording with at least one of said practice module, said playbook generation module, or said plurality of wearable computer devices for in situ review.

3. The interactive, recursive and in situ coaching system of claim 1, wherein said coaching computer module transmits to said server a signal corresponding to first time stamp signal recording to be transmitted to said plurality of wearable player devices for access for display prior to repeating the performance of the first play.

4. The interactive, recursive and in situ coaching system of claim 3, further comprising a trigger within one of said plurality of wearable computer devices to receive said transmission of a signal corresponding to first time stamp signal recording from said server, as sent by said coaching computer module, to access said signal corresponding to first time stamp signal recording on said plurality of wearable computer devices.

5. The interactive, recursive and in situ coaching system of claim 3, wherein each of said plurality of wearable player devices further comprises a display screen which provides a display corresponding to first time stamp signal recording.

6. The interactive, recursive and in situ coaching system of claim 5, wherein each of said plurality of wearable computer devices further includes a user input to enable a player provide a user in situ input in response to said display during practice corresponding to first time stamp signal recording.

7. The interactive, recursive and in situ coaching system of claim 6, wherein the plurality of user wearable computer devices access at least one play from said playbook.

8. The interactive, recursive and in situ coaching system of claim 6, wherein each said display screen of said plurality of wearable computer devices display a play comprising play elements which each user of said plurality of wearable computer devices controls to trigger additional coaching information contained within each said transmitted signal.

9. The interactive, recursive and in situ coaching system of claim 1, wherein the recording of said first play comprises a recording which includes a time stamp, said recording being transmitted through said server from said coaching computer module and stored within the practice module.

10. A process for providing interactive, recursive and in situ coaching system during practice comprising the steps of:
   a) Transmitting from a coaching computer module at least a first selection signal corresponding to a first play from an electronic playbook and a second signal corresponding to a second play from the electronic playbook via a server to a plurality of wearable player electronic displays;
   b) Receiving an input corresponding to the selection signal at hardware controlling at least one video recorder, and in response to the selection signal: i) time stamping, cutting and transferring a video clip recorded by the at least one video recorder corresponding to a previous play to a memory that is accessible by the coaching computer module; and ii) beginning recording activity corresponding to the play by the at least one video recorder;
   c) Developing at least one play through a playbook generation module that is linked to the coaching computer module and transmitting the at least one play via the coaching computer module to a plurality of players and coaches via the plurality of wearable computer devices;
   d) capturing a first time stamp signal recording corresponding to said first selection signal from the coaching computer module, and selecting at least one camera for recording the performance of the first play; and
   e) transmitting to the coaching computer module, the recording of said performance of the first play, upon receiving a second time stamp signal corresponding to said second selection signal from the coaching module.

11. The process of claim 10 comprising the further step of providing via a review input from the coaching computer module recorded activity from the at least one video recorder corresponding to the next play to the plurality of wearable player electronic displays, said review input being provided prior to transmitting of any further selection signal to the plurality of wearable player electronic displays.

12. The process of claim 10 wherein the hardware controlling the at least one video recorder is the server.

13. The process of claim 12 comprising the further step of verifying the selection signal at the server, and permitting the step of transmitting to a plurality of wearable player electronic displays only if authentication has been granted by the server.

14. The process of claim 11, wherein the step of providing via a review input from the coaching computer module further includes coaching input corresponding to the recorded activity from the at least one video recorder corresponding to the next play.

* * * * *